United States Patent [19]
Hogan et al.

[11] Patent Number: 5,343,893
[45] Date of Patent: Sep. 6, 1994

[54] DISTRIBUTION VALVE

[75] Inventors: James V. Hogan; Stephen J. Matheson, both of Fort Erie, Canada

[73] Assignees: Irvin Industries Canada Ltd., Fort Erie; Namtec Corporation, London, both of Canada

[21] Appl. No.: 30,634

[22] Filed: Mar. 12, 1993

[51] Int. Cl.$^5$ ............................................. F16K 3/26
[52] U.S. Cl. ................................. 137/624.13; 5/453; 5/455; 137/625.11; 137/625.16
[58] Field of Search .................... 5/453, 455, 456; 137/624.13, 625.11, 625.15, 625.16, 625.23

[56] References Cited
U.S. PATENT DOCUMENTS

| | | | |
|---|---|---|---|
| 2,447,423 | 8/1948 | Nies | 137/625.11 |
| 2,641,280 | 6/1953 | Fleischhauer | 137/625.11 |
| 3,399,698 | 9/1968 | Bentley | 137/625.23 |
| 3,919,730 | 11/1975 | Regan | 5/456 |
| 5,035,016 | 7/1991 | Mori | 5/455 |
| 5,193,237 | 3/1993 | Holdredge | 137/625.11 |

Primary Examiner—Robert G. Nilson
Attorney, Agent, or Firm—William J. Crossetta

[57] ABSTRACT

This invention relates to a fluid distribution valve comprising a port select valve structure wherein the flow of fluid from a fluid flow source is directed through a chamber of a rotatable member comprising a plurality of varying sized spaced ports which align with ports of a housing at various positions of rotation of the member to provide variations of fluid flow through the ports of the housing. The valve has particular utility as an air distribution valve in an air flow support mattress system.

23 Claims, 4 Drawing Sheets

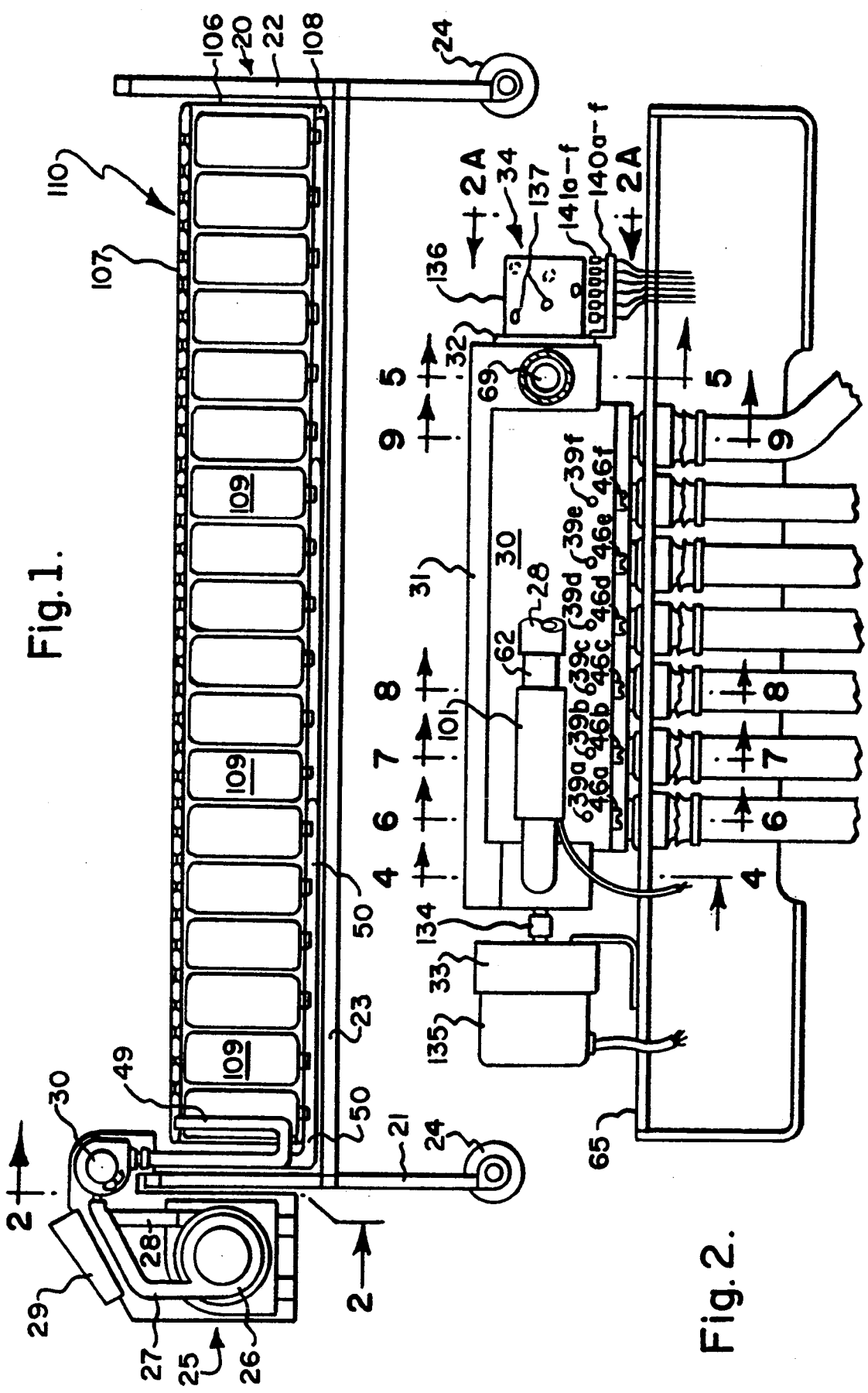

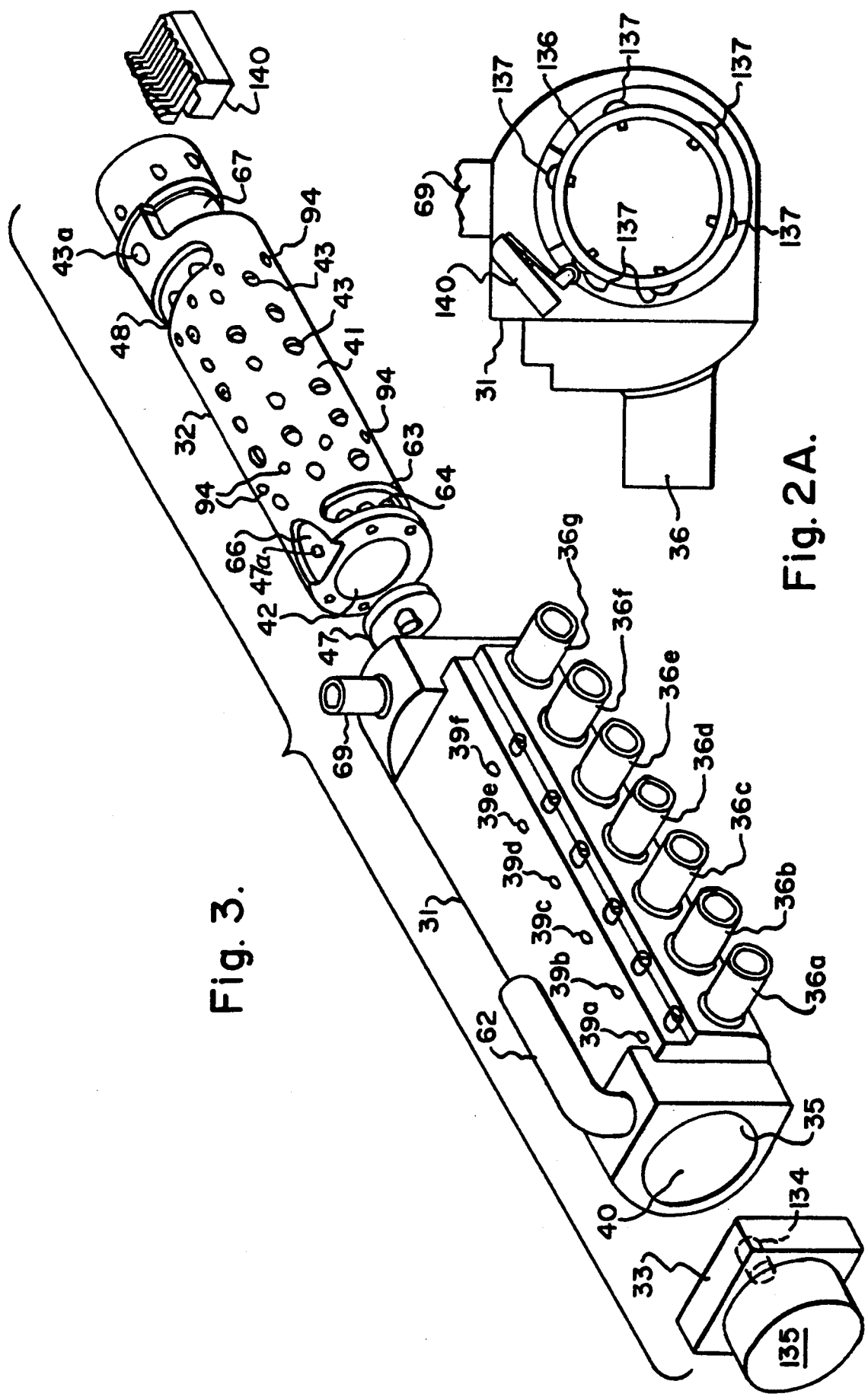

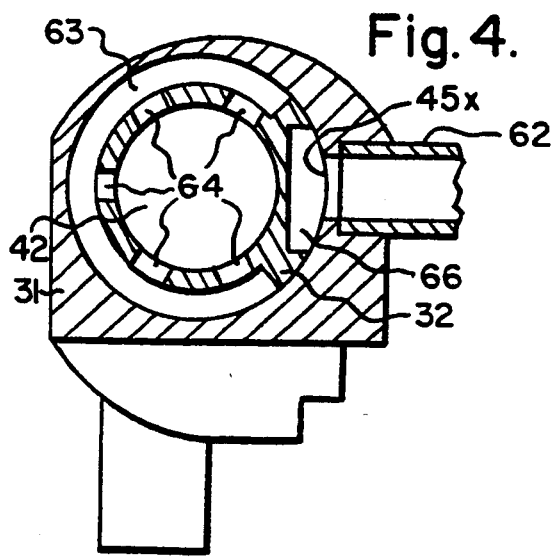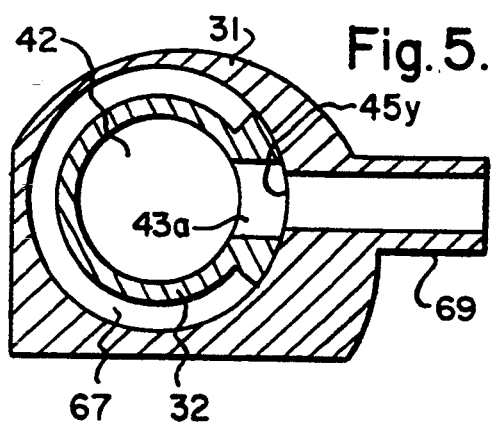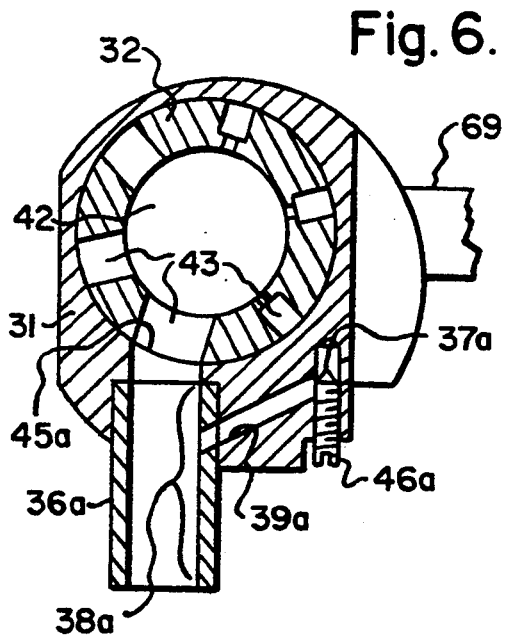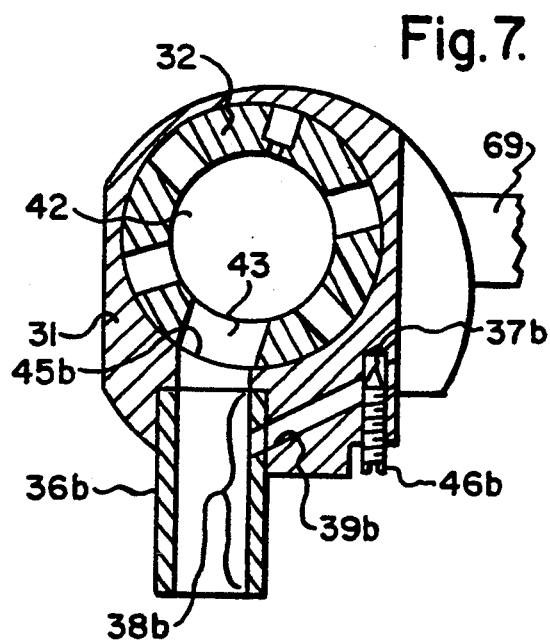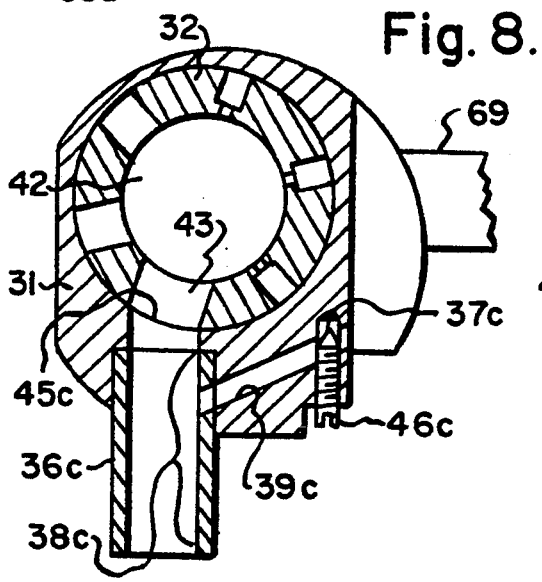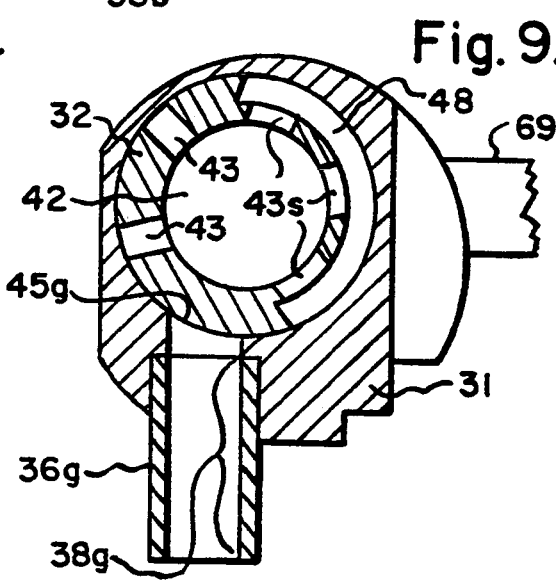

DISTRIBUTION VALVE

FIELD OF THE INVENTION

This invention relates to a fluid distribution valve and control assembly that has particular utility as an air distribution valve for providing control of independent variations of air stream distribution, to multiple components through a unitized assembly having minimum moving parts.

BACKGROUND OF THE INVENTION

A multiplicity of processes, devices and assemblies exist which require distribution of fluid flow from a common source to various discrete passageways and/or compartments. Manifolds are typically used to achieve such distribution and typically comprise a fluid holding compartment with multiple discrete valve units mounted at outlets thereof to control the rate of flow from the manifold to the various discrete locations. Elaborate apparatus have been devised to allow concurrent variation of pluralities of such valves and/or to allow remote control of one or more of such valves. Such apparatus are typically complex, require frequent adjustment and comprise multiple moving parts that are subject to wear and/or failure.

One particular assembly which requires distribution of fluid flow from a common source to various discrete passageways and/or compartments is the air support mattress assembly. Such assemblies generally comprise a plurality of air inflatable cells which are arranged to support a patient reclining thereon. Generally the cells are inflated by maintaining a continuous flow of air thereto and generally it is desirable that the rate of air flowing to individual and/or groups of cells be capable of being interrupted and/or varied. For example, individual and/or groups of cells arranged adjacent various parts of the body of a reclining patient may be desirably maintained at different air flow pressures to achieve different support criteria. Air support cells adjacent a tender wound and/or sore may be inflated to a reduced pressure to provide patient comfort. Air pressure within cells may be varied with articulation of the bed frame or cell pressure may be alternately varied to achieve a pulsing effect or the like.

It is an object of the invention is to provide a fluid valve distribution assembly that is simple to use and comprises minimum moving parts.

Another object of the invention is to provide a fluid valve distribution assembly which can be used for quickly and conveniently reversing fluid flow therethrough.

Still another object of the invention is to provide a convenient and power efficient means to control fluid flow from a common source to a plurality of discrete passageways.

A further object of the invention is to provide a fluid flow valve assembly for use with an air support mattress assembly.

Another further object of the invention is to provide a fluid distribution valve assembly that is simple to manufacture and assemble and convenient for user replacement of critical components.

Additional objects and advantages of the invention will be set forth in part in the description which follows, and in part may be obvious from the description of the invention that follows, or may be learned by practice of the invention. The objects and advantages of the invention may be realized and attained by means of the instrumentalities and combinations particularly pointed out in the appended claims.

SUMMARY OF THE INVENTION

The fluid distribution valve of the invention comprises a housing, having an internal chamber therein containing a plurality of spaced apart ports which are in fluid communication with outlets from the housing. Rotatably mounted in the internal chamber of the housing is a port select element, comprising a manifold chamber therein, which is in fluid communication with a plurality of spaced apart ports positioned on an exterior surface of the element. Multiple ports on the exterior surface of the element are arranged such that they align with a port of the internal chamber of the housing at different positions of rotation of the element within the internal chamber of the housing. Thus, as the element is turned to different positions within the internal chamber of the housing, different ports of the element will align with a port and/or different ports of the internal chamber of the housing, and various of the plurality of ports of the internal chamber of the housing may align, at different positions, with various of a plurality of ports of the element.

It should be understood, by rotatably mounted is meant that the port select element can be turned within the chamber of the housing and it is not meant to require that the element be so mounted as to be capable of undergoing a full rotation within the chamber. Thus, the element may be rotatably mounted to enable full rotation within the chamber of the housing and/or may be rotatably mounted to enable a limited rotation, such as backward or forward turning through a defined arc. In general, full rotation is preferred.

Generally, it is preferred that a surface of the internal chamber and the port select element, at least about aligning ports therein, be rounded so as to enable mating alignment of a ports of the element with a port of the internal chamber of the housing. Other surfaces of the internal chamber and/or exterior surface of the port select element need not however be rounded.

It should be understood that by rounded is meant that a surface is curved such as being in a shape like a ball, cylinder, circle or the like or part thereof, but is not meant to be limited to spherical and/or cylindrical shapes. It is also contemplated as within the invention that rounding of a surface of the chamber and/or port select element includes rounding occasioned by inclusion of aligning means, support means, sealing means or the like which constitute rounded surfaces and enable an alignment of rounded surfaces, between passageways of the port select element and the housing, other than the surfaces of the internal chamber and/or the element. Generally, it is most preferred however, that the housing chamber and the port select element comprise generally mating rounded surfaces and most preferred that the internal chamber and exterior surface of the port select element constitute mating cylindrical surfaces. Mounting of the port select element, within the housing, is preferably such as to provide rotation with resistance to fluid flow leakage between non aligned ports of the housing chamber and/or the port select element.

Though it is generally preferred that the openings constituting ports of the chamber and/or the port select element be round, such is not essential. It should be understood that it is contemplated that ports of the chamber and/or the port select element can be of any operable size and/or shape.

In this application, reference to fluids is meant to include any fluid that might be operable in the device of the invention such as various of the flowing liquids, solids and gases. Reference to air in this application is meant to include any of the various gases operable herewith, such as oxygen, carbon dioxide, nitrogen, argon and the like and specifically to include the various individual and combination of gases generally comprising air.

Generally it is preferred, particularly when the distribution valve is to be used in an air flow system, that outlets from the housing be arranged for convenient connection and disconnection from a plurality of tubes or the like passageways that may be utilized for transporting gases, distributed by the valve of the invention, from the outlets of the valve assembly. In a preferred embodiment of the invention the outlets of the distribution valve are arranged to engage a gang disconnect member which provides common disconnect and connection of a plurality of passageways from a plurality of outlets of the valve housing.

In a further preferred embodiment, the turning of the port select element within the housing is enabled through an electric motor powered drive assembly. In such arrangement precise motor activation and deactivation can be controlled by switch means which can be conveniently instituted through appropriate sensors and/or microprocessor programed sequencing. In a preferred embodiment of the invention, rotational movement of the port select element interacts with switching means to control positioning of the rotation. Thus, in a preferred embodiment of the invention, the incidence of fluid flow through a valve housing outlet is controlled through a programmed microprocessor means, which acts in initiation and/or termination of rotation of the port select element to various positions in the housing.

In a further preferred embodiment, a microprocessor means interacts with a fluid pump means, controlling variations of fluid flow and/or pressure from the fluid supply source and providing fluid flow variation at the selected outlets. In a typical such environment, the microprocessor comprises comparator means which interacts with sensor means and memory means to provide activating signals to switching means that initiate and/or terminate rotation of the port select element and/or variation of fluid flow from a fluid pump means.

In a further preferred embodiment of the invention, the housing of the distribution valve assembly comprises fluid flow adjustment means arranged contiguous with an outlet passageway to allow a more precise adjustment of fluid flow through the outlet. In a preferred embodiment particularly applicable to air flow arrangements, a passageway, contiguous with an outlet passageway of the housing and vented to the atmosphere, comprises an adjustable needle that is arranged to vary the flow of air through the vent.

In still another embodiment of the invention, wherein the fluid supply source comprises a pump having a suction intake, the valve assembly of the invention is arranged in fluid communication between the suction intake of the pump and the fluid supply source. In such arrangement, both the suction intake of the pump and the outlet of the pump are arranged in fluid communication with the internal chamber of the housing of the valve. At a suction evacuation position in rotation of the port select element, a port of the element, having a passageway to the manifold chamber, aligns with a port of the internal chamber that is in fluid communication with the suction inlet of the pump and fluid flow from the outlet of the pump is diverted from entering the manifold chamber. At other positions in rotation of the element the port of the housing chamber which is in fluid communication with the suction inlet is diverted from fluid communication with the manifold chamber of the port select element.

Generally, in an air flow embodiment wherein an air pump provides a suction intake of air from the atmosphere, a port of the internal chamber of the housing in fluid communication with the suction intake of the pump aligns with a slot or the like in the port select element that is in fluid communication with the atmosphere. When the port select element is at a suction evacuation position of rotation, such port of the internal chamber of the housing aligns with a port in the port select element that places the intake of the pump in fluid communication with the manifold chamber of the port select element. Generally, at such position of alignment, the port of the internal chamber in fluid communication with the outlet from the pump aligns with a slot or the like in the port select element that is in fluid communication with the atmosphere.

Thus, when the port select element is rotated to the suction evacuation position, the suction intake of the pump is in fluid communication with the manifold chamber of the port select element and suction evacuates air therefrom and passageways of outlets from the valve that are in port alignment. Air flowing from the outlet of the pump is coincidentally diverted from passing into the manifold chamber of the port select element. Positioning of desired ports in the port select element, which align with ports to outlets of the housing at such suction evacuation position of rotation, allows convenient use of the suction intake of the pump means to evacuate passageways and components which may be in fluid communication therewith.

In a typical air flow embodiment of the fluid distribution valve of the invention the arrangement generally comprises an air pump means for generating air flow and pressure, an air flow distribution valve of the invention, transmission means comprising passageways for the flow of air to air inflation compartments or the like, and a control means for controlling the port selection of the distribution valve.

The air flow assembly of the invention contemplates the use of any suitable air pump means, however, the preferred air pump means comprises a motor driven impeller, mounted in a suitable pump housing such that rotation of the impeller provides a pressurized flow of air to the manifold chamber of the port select element. Preferably, the impeller is driven by a variable speed motor to enable generation of variable flow and/or pressures through the outlet by impeller speed control. Generally, appropriate variable speed electric motors operate with direct current and generally it is preferred that the direct current operating voltage be maintained as low as possible for use in a hospital environment.

The advantages of the invention can be appreciated more fully by reference to the enclosed drawings which depict embodiments of the invention in more detail.

BRIEF DESCRIPTION OF THE DRAWINGS

FIG. 1 is a side elevational view of a hospital bed to which the invention has been applied.

FIG. 2 is a partial sectional view taken along about line 2—2 of FIG. 1, showing an air distribution valve of the invention.

FIG. 2A is an end view taken along about line 2A—2A of FIG. 2.

FIG. 3 is an exploded perspective view of the air distribution valve of FIG. 2.

FIG. 4 is a sectional view taken along about line 4—4 of FIG. 2.

FIG. 5 is a sectional view taken along about line 5—5 of FIG. 2.

FIG. 6 is a sectional view taken along about line 6—6 of FIG. 2.

FIG. 7 is a sectional view taken along about line 7—7 of FIG. 2.

FIG. 8 is a sectional view taken along about line 8—8 of FIG. 2.

FIG. 9 is a sectional view taken along about line 9—9 of FIG. 2.

DETAILED DESCRIPTION OF THE INVENTION

Figure 10:
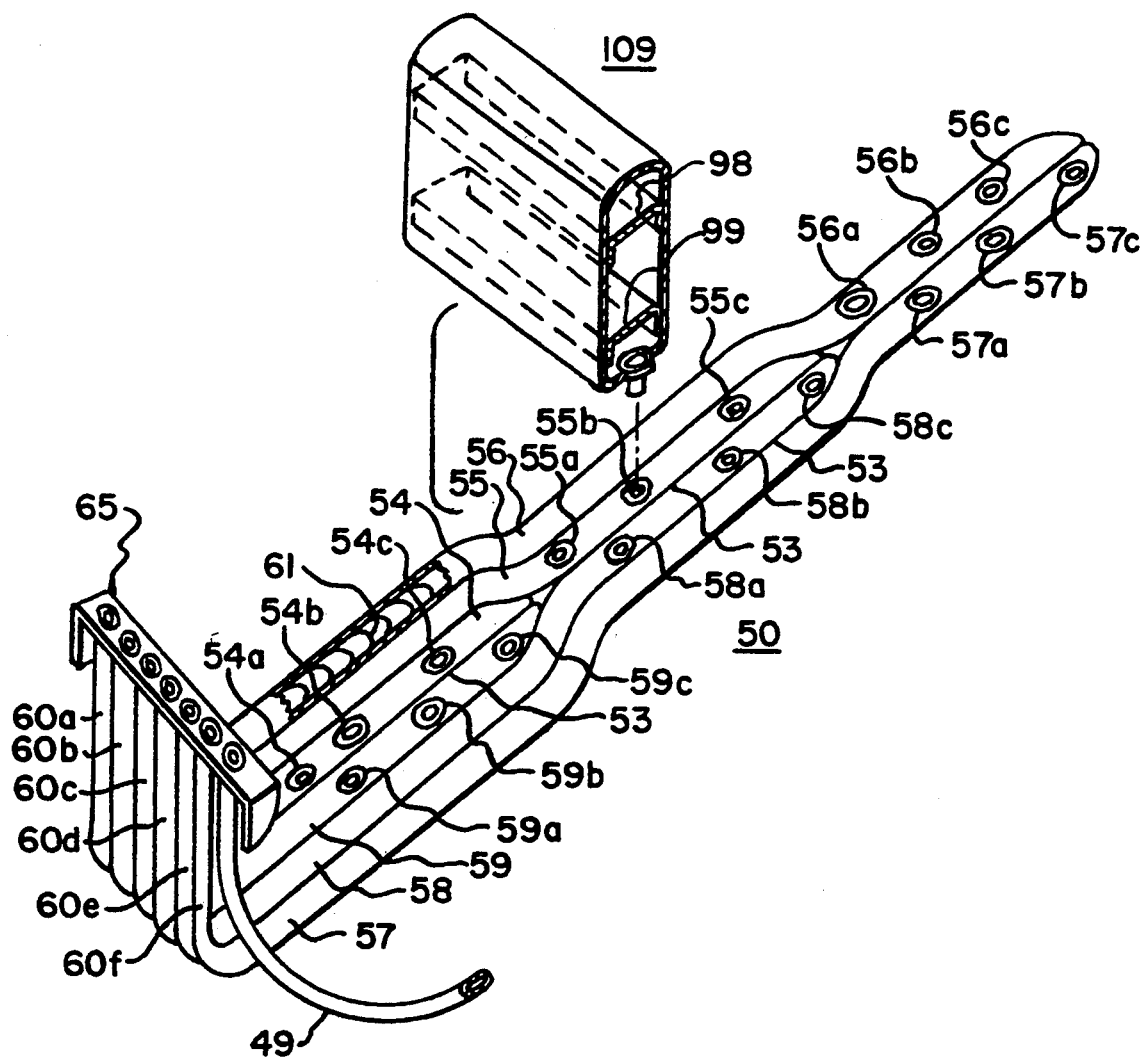
FIG. 10 is an exploded, partial sectional, perspective view of an air flow distribution manifold and cell of the invention.

Referring first to FIG. 1, therein is shown an air support device, comprising a distribution valve of the invention, with components in a typical arrangement on a standard hospital bed frame. In this embodiment of the invention, bed frame 20 comprises vertical base board frame assembly 21, vertical headboard frame assembly 22, mattress support frame assembly 23 extending therebetween and casters 24. Generally, mattress support frame assembly 23 comprises means (not shown) for articulating a mattress supported thereon, generally by raising an end or an intermediate section of the mattress.

Air support mattress 110 is illustrated as generally comprising air cell support bag 105, having sides 106, top 107, base 108 and air cells 109. Air flow distribution manifold 50 can generally be considered a part of the support mattress, for illustration purposes, and would typically be articulated as part of the mattress when arranged on an articulatable mattress support frame assembly.

Air supply unit 25 is illustrated as generally comprising air flow pump 26, air flow conduits 27 and 28, and air flow distribution valve 30 in switching arrangement with microprocessor control console 29 to provide a flow of air through air supply tube 49 to top 107, and through air flow distribution manifold 50 to air cells 109.

Referring now to FIG. 10, therein is illustrated a preferred embodiment of an air flow distribution manifold which is particularly suitable for use with an air distribution valve assembly of the invention. Air flow distribution manifold 50 is illustrated as comprising opposing sheets of longitudinally extending flexible fabric which are joined at spaced, longitudinally extending welds 53 to form discrete passageways 54–59, having inlets 60a–f and outlets 54a–c, 55a–c, 56a–c, 57a–c, 58a–c and 59a–c. It should be understood that though six passageways are depicted for convenience in illustration, it is contemplated that such manifold have any convenient number of passageways connected to any convenient number of air support cells. The passageways are illustrated as comprising spiral wound spacers 61 to resist collapse thereof and inlets 60a–f are shown as being connected through a suitable gang coupler 65 for quick-connect and disconnect to an air distribution valve assembly. Air supply tube 49 is also shown as being connected to gang coupler 65 and provides air flow to an air support blanket which in this embodiment comprises top 107 of air cell support bag 105. Outlets 54a–c, 55a–c, 56a–c, 57a–c, 58a–c and 59a–c are shown as comprising an element of an air flow connector which engages a mating element at the inlet of air cells 109. Air cell 109 is illustrated as comprising baffles 98 and 99. The illustrated air flow connecter and other components of the air support system are shown in detail in copending U.S. application 08/030,656, filed on even date herewith and which is incorporated by reference.

The outlets of the passageways of manifold 50 are arranged to provide a flow of air to every other air cell and pairs of passageways are arranged to provide a flow of air to a group of six air cells.

Referring now to FIGS. 2–9, therein is illustrated an embodiment of a distribution valve assembly particularly suitable for distributing a flow of air to passageways of the illustrated air distribution manifold.

In FIGS. 2 and 2A, air distribution valve 30 is illustrated in arrangement with gang coupler 65 to show a preferred rapid connect, disconnect arrangement of multiple air transmission passageways to the air distribution valve. Therein, air distribution valve 30 is illustrated as comprising housing 31, housing inlet tube 62 with temperature sensor 101, housing outlet 69 and rotatable port select element 32. Rotatable element drive assembly 33 is connected to an end of port select element 32 through drive coupling 134 and is driven by motor 135. Position sensor assembly generally comprises cam 136 and switches 140. Cam 136 is connected to an end of port select element 32, such that it rotates about an axis therewith, and comprises spaced apart lobes 137. Switches 140a–f are mounted to housing 31, adjacent cam 136, and comprise activating levers 141a–f which open and/or close electrical circuits, connected through switches 140a–f respectively, upon engagement and/or disengagement with lobes 137.

In FIGS. 3–9, housing 31 is illustrated as comprising longitudinally extending hollow chamber 40, which has a rounded surface 35 containing ports 45a–g to housing outlet passageways 38a–g respectively, which in turn comprise outlets 36a–g from the housing. Air vent passageways 39a–f, are in contiguous fluid communication with outlet passageways 38a–f respectively and vent to atmosphere. Adjustable flow needle assemblies 46a–g are mounted in threaded passageways 37a–f, and intersect air vent passageways 39a–f respectively in an arrangement such that the flow of air through air vent passageways 39a–f varies with inward and outward adjustment of the flow needle.

Port select element 32 comprises rounded surface 41 and is sized to insert, on assembly, within hollow chamber 40 with bearing pads 94 in cooperating engagement with rounded surface 35. Element 32 comprises interior manifold chamber 42, removable end stop 47 set screw hole 47a and a plurality of spaced ports 43 which are in fluid communication with manifold chamber 42. Ports 43 are of varying size and/or shape and are positioned to be in fluid communication with various of ports 45a–g in rounded surface 35 of internal chamber 40 of the housing at different positions in rotation of the port select element in the housing chamber. Slot 48 is along the periphery of port select element 32 and comprises ports in fluid communication with internal manifold chamber 42 of port select element 32. Thus, as the port select element is turned within housing 31, various of different sized and/or shaped ports and/or slots, in fluid communication with manifold chamber 42 of port select element 32, may be in fluid communication with ports 45a–g of outlet passageways 38a–g of housing 31.

Inlet slot 63, is arranged about a first end of port select element 32, and comprises apertures 64 which are in fluid communication with interior manifold chamber 42 of the port select element. Housing inlet 62 is in fluid communication with an outlet of an air supply source, and comprises a passageway to a port in chamber 40 which, at assembly, aligns with inlet slot 63 at various positions of rotation of the port select element to enable fluid flow from the air supply to housing inlet 62, to inlet slot 63 of port select element 32 and through apertures 64 into interior manifold chamber 42.

Diversion slot 66 is generally positioned between about the ends of inlet slot 63 and has an open side which vents to the atmosphere for diverting fluid flow from the housing inlet from entering interior manifold chamber 42. At what is termed an evacuation position in rotation of port select element 32, housing inlet 62 is in fluid communication with diverting slot 66 of port select element 32, and fluid flow from an outlet of the air supply source through housing inlet 62 is diverted to the atmosphere.

Shunt slot 67 is positioned at the other end of port select element 32, is not in fluid communication with interior manifold chamber 42, and opens to the atmosphere. Port 43a is positioned between about the ends of shunt slot 67 and is in fluid communication with interior manifold chamber 42 of the port select element. In a preferred embodiment, housing outlet 69 is in fluid communication with an inlet of an air supply pump, and comprises a passageway to a port in chamber 40 which, at assembly, aligns with shunt slot 67 at various positions of rotation of the port select element to enable fluid flow from the atmosphere through housing outlet 69, to the intake side of the air pump.

In a most preferred embodiment, a centrifugal suction pump intakes air from the atmosphere though housing outlet 69 of the valve of the invention and pumps air to inlet 62 of the valve. In an evacuation position in rotation of port select element 32, port 43a aligns with a port 45y in chamber 40 which is in fluid communication with housing outlet 69 and the suction intake of the pump is in fluid communication with interior manifold chamber 42 of rotatable element 32. Housing inlet 62 is in communication with diverting slot 66 of port select element 32 and fluid flow, from the outlet of the pump to housing inlet 62, is diverted to atmosphere. Thus, in the air evacuation position of port select element 32, air is sucked into the pump and to atmosphere through interior manifold chamber 42 from the passageways of the outlets of the housing and from components in fluid communication therewith.

FIGS. 4 and 5 comprise sectional views at about inlet 62 and outlet 69, respectively, illustrating the port select element 32 in an evacuation position in housing 31. Therein, inlet port 45x of housing chamber 40, which is in fluid communication with inlet 62, is shown in alignment with diversion slot 66 of port select element 32. Inlet slot 63, which is arranged about port select element 32 and comprises apertures 64 which are in fluid communication with interior manifold chamber 42 of the port select element, is illustrated as not in alignment with port 45x at the evacuation position.

Port 43a of port select element 32 is in fluid communication with manifold chamber 42 and is illustrated as aligned with port 45y of housing chamber 40 which is in fluid communication with outlet 69. Outlet slot 67, which is arranged about port select element 32 and vents to the atmosphere, is illustrated as not in alignment with port 45y at the evacuation position.

FIGS. 6, 7 and 8 comprise sectional views at about various outlets 36a–c, illustrating various ports of the port select element 32 in fluid flow communication with ports to housing outlet passageways 38a–c respectively, which in turn comprise outlets 36a–c from the housing and air vent to atmosphere passageways 39a–c. Adjustable flow needle assemblies 46a–c are illustrated as mounted in threaded passageways 37a–c, and intersect air vent passageways 39a–c respectively in an arrangement such that the flow of air through air vent passageways 39a–c varies with inward and outward adjustment of the flow needle. Various ports 43, in fluid communication with internal manifold chamber 42, are illustrated as being in sequential rotational alignment with ports 45a, 45b and 45c of housing chamber 40.

FIG. 9, comprises a sectional view at about outlet 36g, illustrating port slot 48 comprising various ports 43s to internal manifold chamber 42 of port select element 32 in fluid flow communication with the slot. Port slot 48 is illustrated as being in sequential rotational alignment with port 45g of housing chamber 40.

In a preferred arrangement, the port select element is connected to a drive assembly with the position of the rotation of the port select element being defined through the opening and closing of switches 140a–f, by activating levers 141a–f which engaging lobes 137, which are in cooperating circuitry with a microprocessor console. In a particularly preferred arrangement, switches 140a–f are in communication with a microprocessor which comprises a memory means to which data from the switches is compared by a comparator means which engages and/or disengages the drive assembly in response thereto.

In a typical air flow application of the valve, wherein the air supply source is a pump means, a comparator portion of a microprocessor is programed to position the rotation of the port select element to various positions and at various air supply pump speeds with the influx of data that it receives from a memory portion of the microprocessor and/or operator interceding switching means. A memory portion of the microprocessor comprises data relevant to various multiple conditions that may be invoked and compares such data to generally select signals for positioning of rotation of the port select member and air pump speed accordingly. Switching means, remote and/or on a console, allow interruption by the operator and generally provide direct interaction with signal selection through the comparator means, typically to preset conditions, such as evacuation and the like.

Through the aforesaid, the flow and pressure of air flow to the multiplicity of outlets can be easily customized and particularly in an air support mattress arrangement can provide individualized stress relief to multiple different patients by enabling arrangements of support cells of various shapes which can be inflated to varying degrees for various of a multiplicity of functions.

We claim:

1. A fluid distribution valve comprising:

a housing, having a chamber therein with a surface containing a plurality of spaced apart ports in fluid communication with outlets from said housing;

a port select element, sized to insert and be rotatably mounted within said chamber of said housing;

said port select element comprising a surface having a plurality of spaced apart ports that are in fluid communication with a manifold chamber within said port select element, said plurality of spaced apart ports of said element being greater than the plurality of ports of said housing in fluid communication with outlets;

wherein a plurality of said ports of said port select element are arranged such that they align with a port of said chamber of the housing at different positions in rotation of said port select element within said chamber of said housing, said manifold chamber of said port select element being in fluid communication with an inlet of a fluid supply pump means through a port of said port select element which aligns at a position of rotation with a port of said chamber of said housing.

2. A fluid distribution valve of claim 1 wherein said surface of said chamber of said housing is rounded.

3. A fluid distribution valve of claim 2 wherein said surface of said port select member is rounded and engages said rounded surface of said chamber of said housing.

4. The fluid distribution valve of claim 3 wherein said port select element comprises a cylindrical surface which engages a surface of said chamber of said housing and said element is mounted in said chamber so as to rotate about a longitudinal axis of said cylindrical surface.

5. The fluid distribution valve of claim 4 comprising means to rotate said port select member.

6. The fluid distribution valve of claim 5 wherein said means to rotate comprises electric motor means.

7. The combination of claim 6 in operational communication with a computer means.

8. A fluid distribution valve of claim 2 wherein the surface of said chamber of said housing is cylindrical.

9. The fluid distribution valve of claim 1 comprising means to rotate said port select member.

10. The fluid distribution valve of claim 1 wherein said port select member comprises a slot having a plurality of apertures in fluid communication with said manifold chamber.

11. The fluid distribution valve of claim 10 wherein said slot is arranged to align with a port of said chamber of said housing as said port select element turns through an arc within said chamber of said housing.

12. The fluid distribution valve of claim 11 wherein said port of said chamber of said housing is in fluid communication, through said housing, to an outlet of a fluid supply source.

13. The fluid distribution valve of claim 1 wherein said port select element comprises a slot in fluid communication with the atmosphere.

14. The fluid distribution valve of claim 13 wherein said slot is arranged to align with a port of said chamber of said housing as said port select element turns through an arc within said chamber of said housing.

15. The fluid distribution valve of claim 14 wherein said port of said chamber of said housing aligned with said slot, is in fluid communication through said housing to an inlet of a fluid supply pump means.

16. The fluid distribution valve of claim 1 wherein fluid flowing to said valve from an outlet of said fluid supply pump means is diverted from flowing to said manifold chamber when said port of said select member aligns in fluid communication with said inlet of said fluid supply pump means.

17. The fluid distribution valve of claim 1 wherein said outlets of said housing are aligned for connection to a gang coupler means.

18. The combination comprising a gang coupler means connected to said outlets of said fluid distribution valve of claim 17.

19. The fluid distribution valve of claim 1 comprising venting means in fluid communication with outlets from said housing.

20. The fluid distribution valve of claim 19 wherein said venting means comprises flow adjustment means.

21. The combination of the air distribution valve of claim 1 in operational communication with a computer means.

22. The air distribution valve of claim 1 comprising means for sensing position of rotation of said port select element.

23. The combination of claim 22 in operational communication with a computer means.

* * * * *